Aug. 26, 1969
JEAN-CLAUDE LAGIER 3,463,989
CONTROL CIRCUIT FOR ADJUSTING THE OPERATION OF AN ALTERNATING
CURRENT MOTOR INCLUDING A COMMUTATOR
Filed Sept. 2, 1966
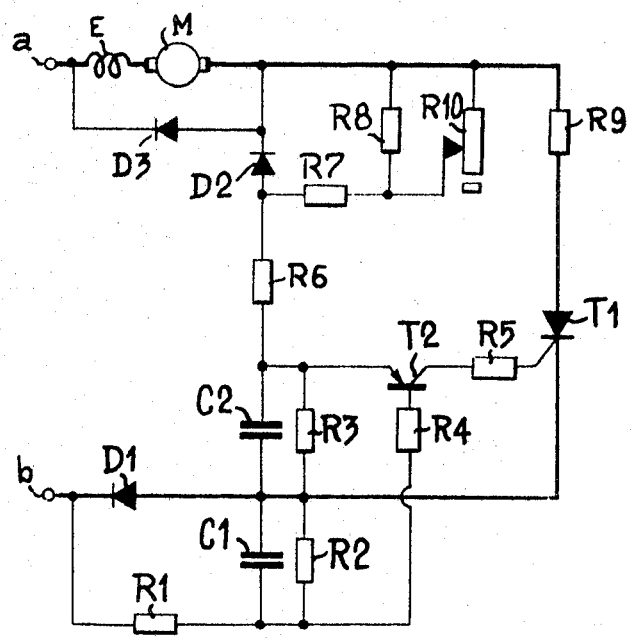
INVENTOR
JEAN-CLAUDE LAGIER
BY Emory L. Groff Jr.
ATTORNEY United States Patent Office 3,463,989
Patented Aug. 26, 1969

3,463,989
CONTROL CIRCUIT FOR ADJUSTING THE OPERATION OF AN ALTERNATING CURRENT MOTOR INCLUDING A COMMUTATOR
Jean-Claude Lagier, Onex, Geneva, Switzerland, assignor to Mefina S.A., Fribourg, Switzerland, a Swiss company
Filed Sept. 2, 1966, Ser. No. 576,912
Claims priority, application Switzerland, Sept. 17, 1965, 12,912/65
Int. Cl. H02p 5/00; H02k 27/20; G05b 5/00
U.S. Cl. 318—332                  5 Claims

ABSTRACT OF THE DISCLOSURE

A speed control circuit for an electric motor of the commutator type in which the motor is connected in a series feed circuit from a source of alternating current with an impedance, a controlled diode and an auxiliary diode. A control circuit is connected to the control electrode of the controlled diode to control the conduction of the same, and is connected to the feed circuit between the motor and the impedance whereby the voltage across the impedance varies with the magnitude of the current passing through the motor to vary the signal level input to the control circuit which biases the voltage on a capacitor in the circuit. An auxiliary condenser circuit is connected to said first condenser for charging by the opposite polarity of the supply signal such that the difference between the voltage on the two condensers controls the advance of the ignition point of the controlled diode when the current through the motor increases.

---

It is a known fact in the prior art that it is possible to adjust the magnitude of the alternating current absorbed by a load by means of at least one controlled diode which is rendered conductive for each alternation of a predetermined polarity. By adjusting the phase-shifting between the beginning of the alternation and the ignition of the controlled diode, it is possible to adjust in a simple manner the average voltage applied to the load and this allows adjusting the current absorbed.

For certain applications, such a simple adjustment is not sufficient and, for instance in the case of an electric motor, it is necessary to also take into account the opposing mechanical resistance presented by the parts driven by the motor.

The present invention has for its object a simple solution of this problem which allows adjusting the speed of rotation of a motor while taking into account the changes in resistance which are to be overcome by the motor.

The present invention has therefore for its object to provide a circuit for adjusting the operation of an electric motor including a commutator and fed with alternating current, by means of at least one controlled diode of which the ignition is produced or initiated at a moment defined by a control circuit so as to ensure the passage of a more or less considerable fraction of one alternation of the current upon operation of a hand-operated adjusting member acting on the control circuit. Said novel circuit arrangement is characterized by a connection between the control circuit and the circuit feeding the motor at a point of the latter at which the signal level is caused to vary in conformity with the current magnitude fed into the motor, said connection producing an advance of the ignition point when the current consumption increases.

The single figure of the accompanying drawing illustrates diagrammatically and by way of example a preferred embodiment of the improved arrangement according to the invention.

Said single figure is a wiring diagram of the circuit of the invention, showing a motor M including a commutator and in which the energizing winding E thereof is connected in series with the motor armature and is fed by a supply of alternating current under 220 v. connected across the terminals $a$ and $b$, the feed circuit arranged to be completed through a circuit comprising a resistance R9, a controlled diode or thyristor T1 and a diode D1.

By reason of the polarity with which the thyristor T1 is connected, it is apparent that the motor M is fed solely by the alternations of a given polarity of the alternating current supply. In order that the excess voltage appearing across the terminals of the motor M during the reversal of the voltage in the supply source may not delay the extinction of the thyristor T1, the motor is shunted by a diode D3. Thus the current feeding the motor at the moment of the reversal of the voltage may continue flowing through said diode D3.

The ignition of the thyristor T1 is initiated by its control electrode fed by a transistor T2. Said control electrode is connected in series with the collector of said transistor T2 through a resistance R5 of 100 ohms. It is to be understood that the parameters of the circuit elements given herein are by way of example only.

The emitter and the base of said transistor are connected respectively with a terminal of the condenser C2 of 32 mf. and through a resistance R4 with a terminal of the condenser C1 of 20 mf., which condensers are shunted by corresponding resistances R3 of 39 kiloohms and R2 of 15 kiloohms. These two condensers are interconnected through their other terminals at a common point in the circuit section connecting the motor M with the supply terminal $b$, said common point lying between the diodes T1 and D1. The terminal of the condenser C1 connected with the transistor T2 is also connected with the supply terminal $b$ through a resistance R1 of 180 kiloohms. The other terminal of the condenser C2 connected with the transistor T2 is also connected with a point of the circuit section connecting the motor M with resistance R9 of 2.2 ohms, through a circuit comprised of three resistances R6, R7, R8 the values of which are respectively 150, 1,000 and 82,000 ohms, the resistance R8 being shunted by an adjustable resistance R10 the value of which can vary between 0 and 20,000 ohms. The resistances R7 and R8 are shunted by a diode D2 inserted in parallel with them.

In the circuit described, the condenser C1 is charged so as to show a reference voltage proportional to the voltage of the alternating current supply. As a matter of fact, when the polarity of the feed current is such that the terminal $b$ is positive with reference to the terminal $a$, the diodes D2 and D3 are conductive while R6 is negligible with reference to the resistance R1, and D1 is not conductive, so that current flows from $b$ to $a$ mainly through R1, C1, C2, R6, D2 and D3.

When the polarity is reversed, that is when the terminal $a$ is positive with reference to the terminal $b$, the diode D1 is conductive and the condenser C1 discharges into the resistances R2 and R1. The average voltage of C1 assumes a value which is defined substantially by the voltage divider constituted by the resistances R1 and R2. Thus, the connecting point between R1 and R2 is always positive with reference to the point connecting the condensers C1 and C2 by a value of say about 10 v. in the case of a supply source feeding alternating current at 220 v.

Similarly, the condenser C2 is charged in a manner such that its terminal connected with the emitter of the transistor T2 becomes positive when the feed current flows through the circuit from the terminal $a$ towards the terminal $b$. The current charging said condenser C2 passes through the motor M and the resistances R10, R8, R7 and R6. A change in the value of the adjustable resistance R10 which is controlled by a member actuated by the operator provides a corresponding change in the duration of charging of the condenser C2. When the current is reversed, that is when the voltage at the terminal $a$ is lower than that at the terminal $b$, the diodes D2 and D3 are conductive while, in contradistinction, the diode D1 blocks the passage of current so that the condenser C2 can be discharged only to a very slight extent by the current charging the condenser C1.

As soon as the voltage of the condenser C2 rises above that of the condenser C1, the transistor T2 becomes conductive and the current flowing through the resistance R6 is shunted through the transistor T2 and the resistance R5 into the electrode controlling the thyristor T1. Further resistances R4 of a value of 100 ohms and R5 are provided for limiting the current flowing through the base and the collector of the transistor T2. The thyristor T1 being ignited, the current from the supply flows from the terminal $a$ through the motor M, the resistance R9, the thryistor T1 and the diode D1 towards the terminal $b$. At the end of the alternation considered, the voltage is reversed so as to lock the diode D1 and to extinguish the thristor T1. At each ignition of the thyristor T1, the condenser C2 discharges partly through the circuit R6, D2 and R9.

The current feeding the motor M passes through the resistance R9 and produces in the latter a drop in voltage which is proportional to the magnitude of the current fed into the motor M. Consequently the voltage at the point connecting the resistances R8 and R9 increases with reference to that of the cathode of T1 when the load on the motor increases, and therefore at the end of the discharge of the condenser C2, the residual voltage across the latter depends on the drop in voltage across the resistance R9. This results in a reduction in the duration of the following charging cycle of the condenser C2 and consequently in an advance of the moment of ignition of the thyristor T1 during the alternation considered. The arrangement therefore supplies the motor M with a voltage which is higher when said motor is subjected to a higher load.

The resistance R9 may be designed in a manner such as to retain proportionality of operation for the voltage divider formed by the resistance R9 and the impedance of the motor when the latter becomes hot. This result may be achieved for instance by constituting the resistance by means of a winding of a copper wire, the heating of which matches the heating of the motor.

Briefly stated, the duration of charging of the condenser C2 depends, on the one hand, on the adjustment provided for the variable resistance R10 by the operator and, on the other hand, on the value of the current flowing through the motor M. Thus, throughout the range of adjustment of the resistance R10, the feed of current is increased when the torque to be supplied by the motor M increases.

It should furthermore be remarked that the resistance R8 is essential in order to prevent any reversal of polarity in the condenser C2, constituted in the case illustrated by an electrolytic condenser. As a matter of fact, such a reversal might arise when the slider associated with the variable resistance R10 is shifted towards the end of its path so as to cut out said resistance which assumes thus an infinite value.

A further advantage of the circuit illustrated is ascribable to the fact that the reference voltage of the condenser C1 is substantially proportional to the voltage of the supply source so that the ignition of the thryistor T1 is initiated at a moment which depends also on the voltage of the supply source and is obtained earlier when the voltage drops and reversely, which ensures a compensation for the influence of the fluctuations in the supply source voltage on the torque supplied by the motor M.

Obviously, the values of the components of the arrangement described may vary as required by the supply of current available and by the expected performances.

I claim:

1. A control system for an alternating current motor including a commutator comprising, a feed circuit including said motor adapted for connection to a source of alternating current, a controlled diode including a control electrode connected in said feed circuit, an impedance in said feed circuit between said controlled diode and motor and fed by at least a fraction of the current passing through the feed circuit, the voltage across said impedance producing at a predetermined point of the feed circuit a signal level which varies in conformity with the magnitude of the current passing through the motor, a control circuit connected to said control electrode and connected to said predetermined point, manually operable means connected in said control circuit and controlling the moment at which the control circuit energizes said control electrode for ignition of said controlled diode during each current alternation the polarity of which registers with the direction of conductivity of the controlled diode, a condenser in said control circuit adapted to be discharged into said control electrode and the voltage across which is biased by the voltage at said predetermined point such that a voltage drop at said predetermined point causes a discharge of said condenser, whereby the moment at which the control circuit energizes the control electrode shifts with the duration of charging of the condenser in the control circuit to a predetermined voltage to produce a lead of the ignition of the controlled diode in accordance with the increase in the current magnitude flowing through the motor.

2. A control system as set forth in claim 1 including a further diode connecting the end of said condenser connected to said control electrode with said feed circuit at a position ahead of the controlled diode in the direction of conductivity of the latter, and said condenser connected to partly discharge through said further diode upon ignition of said controlled diode.

3. A control system as set forth in claim 1 including an auxiliary diode connected in said feed circuit in series with said controlled diode and having a direction of conductivity the same as said controlled diode, said condenser connected to said feed circuit between the said two diodes and beyond the controlled diode in the direction of conductivity of the latter, and said auxiliary diode adapted to protect said controlled diode against excess voltages in the opposite direction.

4. A control system for an alternating current motor including a commutator comprising, a feed circuit adapted for connection to a source of alternating current including said motor, a controlled diode including a control electrode connected in said feed circuit, an impedance in said feed circuit with said controlled diode fed by at least a fraction of the current passing through the feed circuit producing at a predetermined point of the feed circuit a signal level which varies in conformity with the magnitude of the current passing through the motor, a control circuit connected to said control electrode and connected to said predetermined point, manually operable means connected in said control circuit and defining the moment at which the control circuit energizes said control electrode for ignition of said controlled diode during each current alternation the polarity of which registers with the direction of conductivity on the controlled diode, a condenser in said control circuit the voltage across which is biased by the variations in signal level at said predetermined point, an auxiliary condenser, rectifying means connected to feed said auxiliary condenser with the current alternations in said feed circuit opposed to the direction of conductivity of said controlled diode, whereby said auxiliary condenser is charged to a reference voltage proportional to that of the feed circuit, and a transistor in said control circuit fed by the difference in voltage between the two condensers and feeding the control electrode whereby the moment of energization of the control electrode shifts with the duration of charging of the condenser in the control circuit to a predetermined voltage, to produce a lead of the ignition of the controlled diode in accordance with the increase in the current magnitude flowing through the motor.

5. A control system for an alternating current motor including a commutator comprising, a feed circuit provided with terminals adapted to be fed with alternating current, a first resistance, a controlled diode and an auxiliary diode the direction of conductivity of which is the same as that of the controlled diode, inserted in sequence beyond the motor in said circuit in the direction of conductivity of both diodes, a first condenser and resistance means inserted in series across the section of the feed circuit including the first resistance and the controlled diode, the first condenser having one terminal connected with a point of said circuit section between the two diodes, a second condenser one terminal of which is connected with said terminal of the first condenser, a voltage divider inserted in parallel across said terminal and the auxiliary diode and to a point of which the other terminal of the second condenser is connected, an adjustable hand-operable impedance in parallel with at least a fraction of the resistance means in series with the first condenser, a transistor the emitter and base of which are connected with those terminals of the two condensers which are not connected with each other and the collector of which feeds the control electrode of the controlled diode to initiate the ignition of the latter at a moment of the alternation adapted to pass through the control electrode, which moment is defined by the voltage ahead of the first resistance and consequently by the current magnitude in the motor, and rectifying means inserted between the terminal of the first condenser opposed to the second condenser and the feed circuit ahead of the motor and the polarity of which ensures charging of the two condensers, said rectifying means including a further diode connected with a point of the feed circuit between the motor and the first resistance and through which the first condenser discharges partly upon ignition of the controlled diode.

References Cited

UNITED STATES PATENTS 3,127,550    3/1964    Gilbreath et al.    318—331
3,358,205   12/1967    Wechsler    318—332

ORIS L. RADER, Primary Examiner

R. J. HICKEY, Assistant Examiner

U.S. Cl. X.R.

318—345